United States Patent
Sung et al.

[11] Patent Number: 6,045,472
[45] Date of Patent: Apr. 4, 2000

[54] INTEGRATED UP-AND DOWNSHIFTING CONFIGURATION OF A MULTISTAGE SPROCKET ASSEMBLY FOR A BICYCLE

[75] Inventors: Cheng-kuo Sung; Hsi-Fu Lin; Kuo-Hung Yu, all of Hsinchu, Taiwan

[73] Assignee: National Science Council, Taipei, Taiwan

[21] Appl. No.: 09/000,833

[22] Filed: Dec. 30, 1997

[51] Int. Cl.[7] .............................. F16H 55/12; F16H 55/30
[52] U.S. Cl. ............................................ 474/160; 474/158
[58] Field of Search .................................. 474/158, 160, 474/155–157, 164

[56] References Cited

U.S. PATENT DOCUMENTS

| | | | |
|---|---|---|---|
| 4,889,521 | 12/1989 | Nagano | 474/164 |
| 5,162,022 | 11/1992 | Kobayashi | 474/160 |
| 5,188,569 | 2/1993 | Kobayashi | 474/160 |
| 5,192,249 | 3/1993 | Nagano | 474/160 |
| 5,192,250 | 3/1993 | Kobayashi | 474/162 |
| 5,409,422 | 4/1995 | Feng et al. | 474/156 |
| 5,437,582 | 8/1995 | Romano | 474/160 |
| 5,503,598 | 4/1996 | Neuer et al. | 474/160 |
| 5,690,570 | 11/1997 | Chang et al. | 474/158 |
| 5,716,297 | 2/1998 | Bodmer | 474/160 |
| 5,738,603 | 4/1998 | Schmidt et al. | 474/158 |
| 5,759,124 | 6/1998 | Sung | 474/158 |

*Primary Examiner*—David A. Bucci
*Assistant Examiner*—Matthew A. Kaness
*Attorney, Agent, or Firm*—Jacobson, Price, Holman & Stern, PLLC

[57] ABSTRACT

A multistage sprocket assembly for a bicycle comprises at least one larger sprocket and at least one smaller sprocket, in which both side surfaces of the larger sprocket are trimmed off at the positions corresponding to two downshifting paths and two upshifting paths designed for a drive chain when being shifted from the smaller sprocket to the larger sprocket or vice versa. The trim portion is large and deep enough to avoid any interference between the link plates of the chain and the larger sprocket, and to receive therein the link plates of the chain so as to provide a positioning function thereat during the chain shifting process.

4 Claims, 9 Drawing Sheets

INTEGRATED UP-AND DOWNSHIFTING CONFIGURATION OF A MULTISTAGE SPROCKET ASSEMBLY FOR A BICYCLE

BACKGROUND OF THE INVENTION

The multistage sprocket assembly of a bicycle's derailleur system comprises at least one larger sprocket and at least one smaller sprocket, in which each of the sprocket has a plurality of teeth and is adapted to engage with a drive chain. During a chain shifting process, the chain is shifted from one sprocket, which is referred to as the original sprocket, to adjacent one, which is referred to as the targeted sprocket, with the guidance of the derailleur. For a smooth chain shifting process, the chain must be well engaged with the teeth of the targeted sprocket after the completion of chain shifting motion instead of striding on the tooth tops of the targeted sprocket and then swiftly falling down to the grooves causing the rider to experience an impact from the peddle. Pertinent patents primarily concentrate on the tooth modification of the sprocket solely for the downshifting or solely for the upshifting motions of the chain. The main objective is to allow a smooth chain shifting process from the smaller sprocket to the larger sprocket, or vice versa, by adjusting the relative position between the larger and smaller sprockets, as well as partially modifying the teeth of the sprockets. Basically, in the sprocket modification approach, the chain in the shifting process is deemed as a cutting tool which removed the interference portion between the chain and the sprockets. The modification method and interference amount are influenced by the sprocket specification and the designed shifting path of the chain. On the other hand, the exact shifting position is controlled by the chamfers on the teeth of larger sprocket which enable the chain to fall back to the original sprocket when the chain is not supposed to escape the original sprocket at that position.

The content of the U.S. Pat. No. 4,889,521, is focused on tooth modification for smooth downshifting process of the chain. Its characteristic is in the trimming on two to three teeth of the larger sprocket which allows the chain to be smoothly shifted to the larger sprocket from the smaller sprocket. The chain links between the larger and smaller sprockets are aligned to be a straight line and its length is equal to an integer multiple of chain pitch. Both will decide the adjustment of the relative position between the larger and smaller sprockets.

Another patent that uses the method of tooth modification on the larger sprocket for the downshifting process of the chain is U.S. Pat. No. 5,409,422. In this invention, the position of each of the chain links between the larger and smaller sprockets during the chain shifting process is first adjusted. Following this, the relative phase angle between the larger and smaller sprockets is obtained. Based on the adjusted relative phase angle between the two sprockets, at least two consecutive teeth of the smaller sprocket and at least three consecutive teeth of the larger sprocket are then modified for a smooth downshifting process of the chain.

In the content of the U.S. Pat. No. 5,192,250, the design is aimed at the smooth upshifting motion of the chain. The main feature is in modifying the teeth of the larger sprocket so that each of the modified teeth forms a supporting portion to raise the chain link. The relative position between the larger and smaller sprockets is set so that the straight-line distance between the center of the last chain roller being supported and the center of one tooth space of the smaller sprocket is np or np-$\beta$ (where p is the chain pitch, n is an integer, and $\beta$ is smaller than half the chain pitch).

Generally, the chain shifting motion of a multi-speed bicycle can divided into upshifting and downshifting. A bumpy upshifting or downshifting will cause rider's discomfort during the chain shifting process. In order to design a sprocket assembly that possesses both smooth upshifting and downshifting performance, the following problems have to be solved: (1) After adjusting the phase angle between the larger and smaller sprockets according to the downshifting motion of the chain, can an appropriate phase angle be obtained for the upshifting motion of the chain? (2) Will there be a canceling effect on the function if the modification on the sprocket teeth is done for both the upshifting and the downshifting processes of the chain?

Among the current pertinent patents, the tooth modifications done to the sprockets to improve chain shifting performance are solely focused on the downshifting process or solely on the upshifting process of the chain. There has been no design for the sprocket assembly to provide both smooth upshifting and downshifting process of the chain.

SUMMARY OF THE INVENTION

The invention provides a multistage sprocket assembly for a bicycle which solves the aforementioned problems in the conventional design of sprocket assembly, i.e. provides both smooth downshifting and upshifting processes of the chain. According to the invention, the relative phase angle between the larger sprocket and the smaller sprocket is adjusted such that the downshifting phase angle defined based on the downshifting motion of the chain is equal to or somewhat different from the upshifting phase angle defined based on the upshifting motion of the chain. According to the adjusted relative phase angle between the larger and smaller sprockets, the locations of chain links during the chain shifting process are designated for the basis of trimming the teeth of the larger sprocket for a smooth chain shifting process.

The multistage sprocket assembly of the invention comprises at least one larger sprocket and at least one smaller sprocket, and is adapted to engage with a drive chain guided by a derailleur. When the chain is shifted from the smaller sprocket to the larger sprocket, the center of last roller engaged with the smaller sprocket is referred to as the downshifting escape point, and the center of the first roller engaged with the larger sprocket is referred to as the downshifting engagement point. The angle formed by the downshifting escape point and the downshifting engagement point to the sprocket center is referred to as the downshifting phase angle. On the other hand, when the chain is shifted from the larger sprocket to the smaller sprocket, the center of last roller engaged with the larger sprocket is referred to as the upshifting escape point, and the center of the first roller engaged with the smaller sprocket is referred to as the upshifting engagement point. The angle formed by the upshifting escape point and the upshifting engagement point to the sprocket center is referred to as the upshifting phase angle.

In this invention, the upshifting escape point is positioned forward the downshifting engagement point in the rotation direction of the sprocket assembly, and there are at least three sprocket teeth between the two points. Furthermore, the relative phase angle between the larger and smaller sprockets is adjusted so that the downshifting phase angle is equal to or somewhat different from the upshifting phase angle.

According to the designated relative positions between the downshifting engagement point and the upshifting escape point and the adjusted phase angle between the larger and smaller sprockets, two downshifting paths and two upshifting paths for the chain are designed as the basis of trimming the teeth of the larger sprocket for smooth downshifting and upshifting processes of the chain. In the trimming method, the location of each chain link in the designed shifting paths is obtained. The interference portion between the chain links and the larger sprocket during the chain shifting process is then the basis to trim the teeth of the larger sprocket. In other words, each of the chain links in the designed shifting paths is considered as a cutting tool to cut off the interference portion between the chain links and the larger sprocket. The trim portion is thus large and deep enough to avoid any interference between the link plates of the chain and the larger sprocket, and to receive the link plates of the chain so as to provide positioning function during the shifting motion of the chain.

The exact tooth number between the downshifting engagement point and the upshifting escape point is set for the basis of designing the downshifting and upshifting paths of the chain, and is thus dependent on the tooth numbers of the larger and smaller sprockets. As the tooth number between the downshifting engagement point and the upshifting escape point can be an odd or even numbers, the integrated trim portion for the smooth downshifting and upshifting motions on the side surface of the larger sprocket facing the smaller sprocket thus may have many patterns.

REFERENCE NUMBER OF THE ATTACHED DRAWINGS

Figure 1:
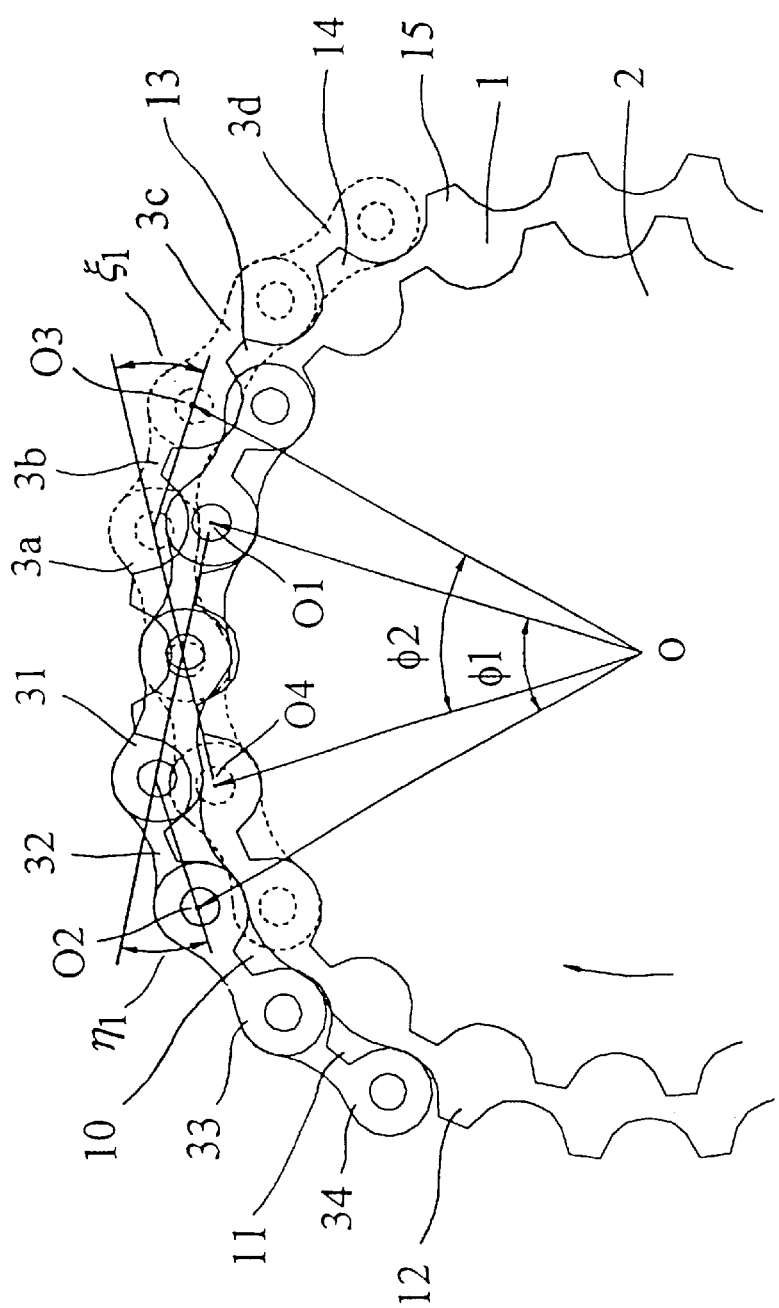
FIG. 1 is a front view showing the first type of downshifting and upshifting processes of the chain.

1 . . . larger sprocket
2 . . . smaller sprocket
3 . . . drive chain
31, 33, 36, 38, 3a, 3c, 3f, 3h . . . outer pitch
32, 34, 35, 37, 39, 3b, 3d, 3e, 3g, 3i . . . inner pitch
41, 42, 43 . . . trim portion on the front side surface of larger sprocket for downshifting
4a, 4b, 4c . . . trim portion on the front side surface of larger sprocket for upshifting
4 . . . integrated trim portion comprising trim portions 41, 42, 43, 4a, 4b and 4c on the front side surface of larger sprocket
10, 11, 12, 13, 14, 15 . . . sprocket tooth of larger sprocket O . . . center point of sprocket assembly
O1 . . . downshifting escape point
O2 . . . downshifting engagement point
O3 . . . upshifting escape point
O4 . . . upshifting engagement point
O5 . . . second downshifting escape point
O6 . . . second upshifting engagement point
$\phi 1$ . . . downshifting phase angle
$\phi 2$ . . . upshifting phase angle $\Theta 1, \eta 2, \zeta 1, \xi 2$ . . . articular angle between two adjacent inner and outer pitches

DETAILED DESCRIPTION OF THE INVENTION

This invention is designed for a multistage sprocket assembly for a bicycle's derailleur system, which consists of at least one larger sprocket 1 and at least one smaller sprocket 2. The multistage sprocket assembly is adapted to engage with a drive chain comprising pairs of link plates pivotally connected to each other by articulation pins and rollers. During a chain shifting process, the chain 3 is shifted from one sprocket, which is referred to as the original sprocket, to adjacent one, which is referred to as the targeted sprocket, with the guidance of the derailleur. By modifying the teeth of the larger sprocket 1, the chain 3 thus can execute smooth downshifting or upshifting motions.

When the chain 3 is shifted from the original sprocket to the targeted sprocket, the center of the last roller that engages with the original sprocket is referred to as the escape point, and the center of the first roller that engages with the targeted sprocket is referred to as the engagement point. The chain links between the escape point and the engagement point during a chain shifting process is referred to as the transit chain, and the location of transit chain forms the shifting path of the chain.

The downshifting motion of the chain 3 as shown in FIG. 1 (portion of chain with solid line) is the shifting motion from the smaller sprocket 2 to the larger sprocket 1. In this shifting process, the smaller sprocket 2 is the original sprocket, and the larger sprocket 1 is thus the targeted sprocket. The escape point, in this case, is referred to as the downshifting escape point O1, and the engagement point is referred to as the downshifting engagement point O2. On the other hand, the upshifting motion of the chain 3 (portion of chain with dashed line) is the shifting motion from the larger sprocket 1 to the smaller sprocket 2. In this shifting process, the larger sprocket 1 is the original sprocket, and the smaller sprocket 2 is thus the targeted sprocket. In this case, the escape point is referred to as the upshifting escape point O3, and the engagement point is referred to as the upshifting engagement point O4. The angle formed by the escape point and the engagement point to the center O of the sprocket assembly is defined as the phase angle between the larger sprocket 1 and the smaller sprocket 2. In the downshifting motion this phase angle is referred to as the downshifting phase angle $\phi 1$ while in the upshifting motion this phase angle is referred to as the upshifting phase angle $\phi 2$, as shown in FIG. 1.

When each of the reference point selected from the larger sprocket 1 and smaller sprocket 2 is utilized to define the relative position or phase angle between the two sprockets according to a particular relationship, the other corresponding relative positions of points on the larger sprocket 1 and smaller sprocket 2 are also defined accordingly. As shown in FIG. 1, when the smaller sprocket 2 remains stationary while the larger sprocket 1 rotates clockwise, the downshifting phase angle φ1 will gradually decrease while the upshifting phase angle φ2 will gradually increase. On the contrary, when the larger sprocket 1 rotates counterclockwise, the downshifting phase angle φ1 will gradually increase while the upshifting phase angle φ2 will gradually decrease. The calculation derived from this relationship reveals that the sum of the downshifting phase angle φ1 and the upshifting phase angle φ2 is a constant value.

In this invention, the upshifting escape point O3 is positioned forward the downshifting engagement point O2 in the rotation direction of the sprocket assembly, and there are at least three teeth between the two points. The exact tooth number between the two points is designated and dependent on the tooth numbers of smaller and larger sprockets. Based on the designated locations of the downshifting engagement point O2 and the upshifting escape point O3, the relative position between the larger sprocket 1 and the smaller sprocket 2 is adjusted so that the downshifting phase angle φ1 is equal to or somewhat different from the upshifting phase angle φ2.

With respect to the downshifting of the chain 3, consideration is made that the first chain link leading to the downshifting engagement point O2 can be an inner pitch or outer pitch. In this invention, two different downshifting paths are designed for the basis to trim off the sprocket teeth of the larger sprocket. When the first chain link reaching over the downshifting engagement point O2 is the inner pitch 32, then all the transit-chain links, other than the inner pitch 32, are aligned as a straight line, as shown in FIG. 1. Thereafter, the articular angle η1 between the inner pitch 32 and the adjacent outer pitch 31 is adjusted to allow the downshifting escape point O1 and downshifting engagement point O2 to respectively fall into the grooves of the smaller sprocket 2 and the larger sprocket 1. According to the setting of the above chain links between the downshifting escape point O1 and the downshifting engagement point O2, the shifting path of the transit chain is referred to as the first downshifting path.

Figure 2:
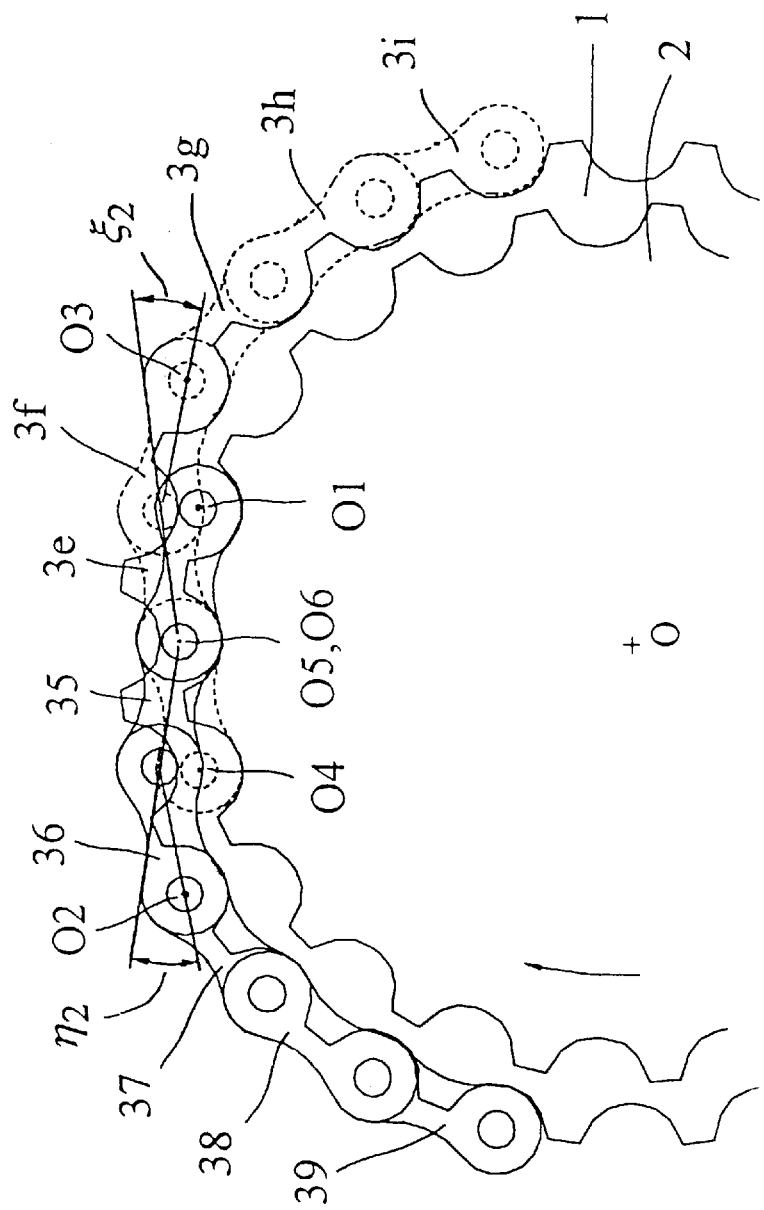
FIG. 2 is a front view showing the second type of downshifting and upshifting processes of the chain.

When the first chain link reaching over the downshifting engagement point O2 is the outer pitch 36, as shown in FIG. 2, then the second downshifting escape point O5 is designated beside the downshifting escape point O1 by one tooth in the opposite rotation direction of the sprocket assembly. The position of the downshifting engagement point O2 remains stationary and the number of transit-chain links needed for a chain shifting process is thus reduced by one. In this case, if the number of transit-chain links is more than two, the transit-chain links, other than the outer pitch 36, are aligned as a straight line. The articular angle η2 between the outer pitch 36 and inner pitch 35 is then adjusted so that both ends of the transit chain are respectively engaged with the larger and smaller sprockets. If the number of transit-chain links is two, as the condition illustrated in FIG. 2, then only the articular angle η2 is adjusted in accordance with the shifting of downshifting escape point. According to the setting of the above chain links between the second downshifting escape point O5 and the downshifting engagement point O2, the shifting path formed by the transit-chain links is referred to as the second downshifting path.

The above design method of the shifting paths reveals that during the downshifting process of the chain 3, if the first chain link reaching the downshifting engagement point O2 is going to be an inner pitch, the chain 3 will execute the downshifting motion by following the first downshifting path. If the first chain link reaching the downshifting engagement point O2 is going to be an outer pitch, the chain 3 will execute the downshifting motion by following the second downshifting path.

In this invention, the design of upshifting paths of the chain 3 is similar to that for downshifting motion. As the upshifting process shown on the portion of the chain with dashed line in FIG. 1, when the inner pitch 3b is the first chain link to escape from the upshifting escape point O3, then all the transit links, except for the inner pitch 3b, are aligned as a straight line. After this, the articular angle ζ1 between the inner pitch 3b and the adjacent outer pitch 3a is adjusted so that the upshifting escape point O3 and upshifting engagement point O4 are separately located in the grooves of the larger sprocket 1 and smaller sprocket 2. According to the condition planned by this type of shifting path, the location of the transit-chain links between the upshifting escape point O3 and the upshifting engagement point O4 is referred to as the first upshifting path.

As shown by the portion of the chain in dashed line in FIG. 2, when the outer pitch 3f is the first chain link to escape from the upshifting escape point O3, then the second upshifting engagement point O6 beside the upshifting engagement point O4 by one tooth in the forward rotation direction of the sprocket is designated. The location of upshifting escape point O3 remains unchanged, and the number of transit-chain links needed for a chain shifting process is thus reduced by one. In this case, if the number of transit-chain links is more than two, the transit-chain links, other than the outer pitch 3f, are aligned as a straight line. The articular angle ζ2 between the outer pitch 3f and inner pitch 3e is then adjusted so that both ends of the transit chain are respectively engaged with the larger and smaller sprockets. If the number of transit-chain links is two, as the condition shown in FIG. 2, the articular angle ζ2 between the outer pitch 3f and the adjacent inner pitch 3e is adjusted in accordance with the shifting of upshifting engagement point. The chain-shifting path formed according to the above designated position of the transit chain is referred to as the second upshifting path.

According to the design of the above two upshifting paths, if the first chain link escaping from the upshifting escape point O3 is an inner pitch, the chain 3 will execute the upshifting motion by following the first upshifting path. If the first chain link escaping from the upshifting point O3 is an outer pitch, the chain 3 will execute the upshifting motion by following the second upshifting path.

Figure 3:
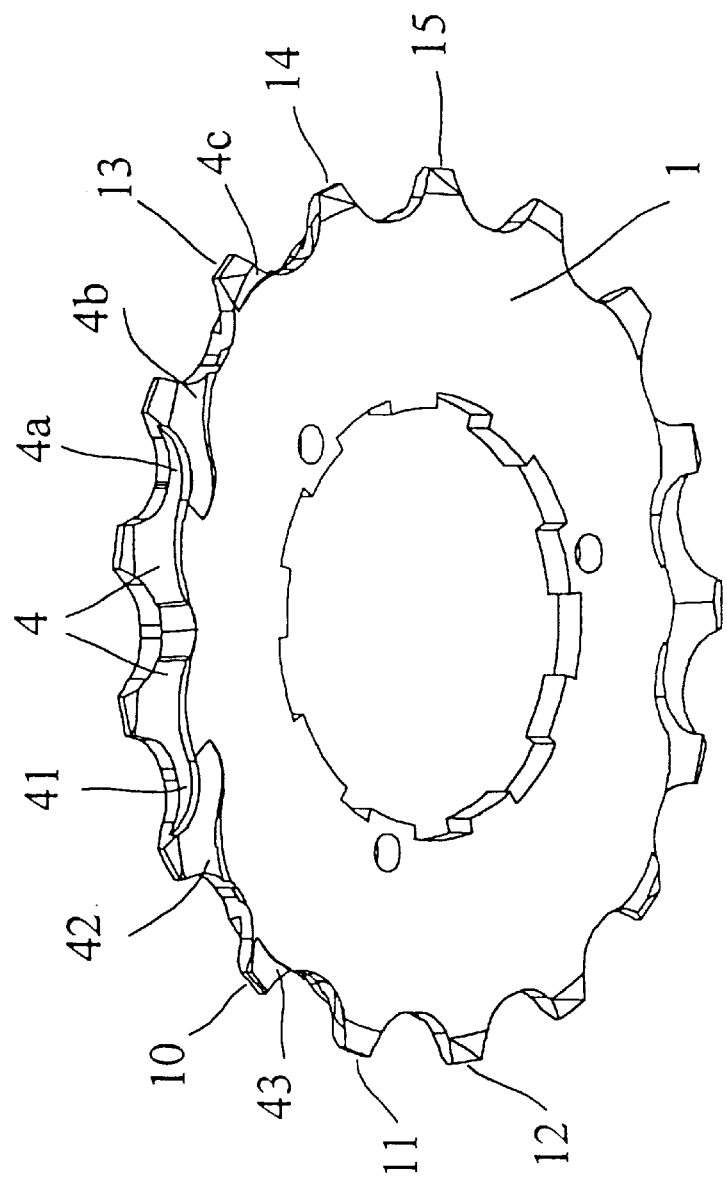
FIG. 3 is a front view of the larger sprocket showing the trim portion on its side surface.

To assure the designed shifting motion of the chain 3, a suitable trimming on the teeth of the larger sprocket 1 at the inside surface thereof facing the smaller sprocket 2 and at the positions corresponding to the chain links in the designed shifting paths should be made so as to provide a positioning function thereat. The integrated trim portion 4 which comprises trim portions 41, 42, 43 and trim portions 4a, 4b, 4c shown in FIG. 3 is large enough to receive therein the link plates of the chain 3 so that the chain 3 can be reliably shifted from the smaller sprocket 2 to the larger sprocket 1 or from the larger sprocket 1 to the smaller sprocket 1 without any interference between the side link plates of the chain 3 and the larger sprocket 1. The integrated trim portion 4 recessed at the inside surface of the larger sprocket 1 is also preferably deep enough to support the side link plates of the transit chain so that the articular angle in each designed shifting path for the chain 3 can be formed. Accordingly, the chain 3 actually follows the designed shifting path for a smooth chain shifting process.

In brief, the integrated trim portion 4 is used to assure the location of each chain link between the larger sprocket 1 and the smaller sprocket 2 during the chain shifting process. The size and depth of the integrated trim portion 4 are corresponding to the interference portion between the side link plates of the chain 3 and the larger sprocket 1 during the chain shifting process. The integrated trim portion 4 can be considered as a cutout from the aforesaid interference portion.

Figure 4:
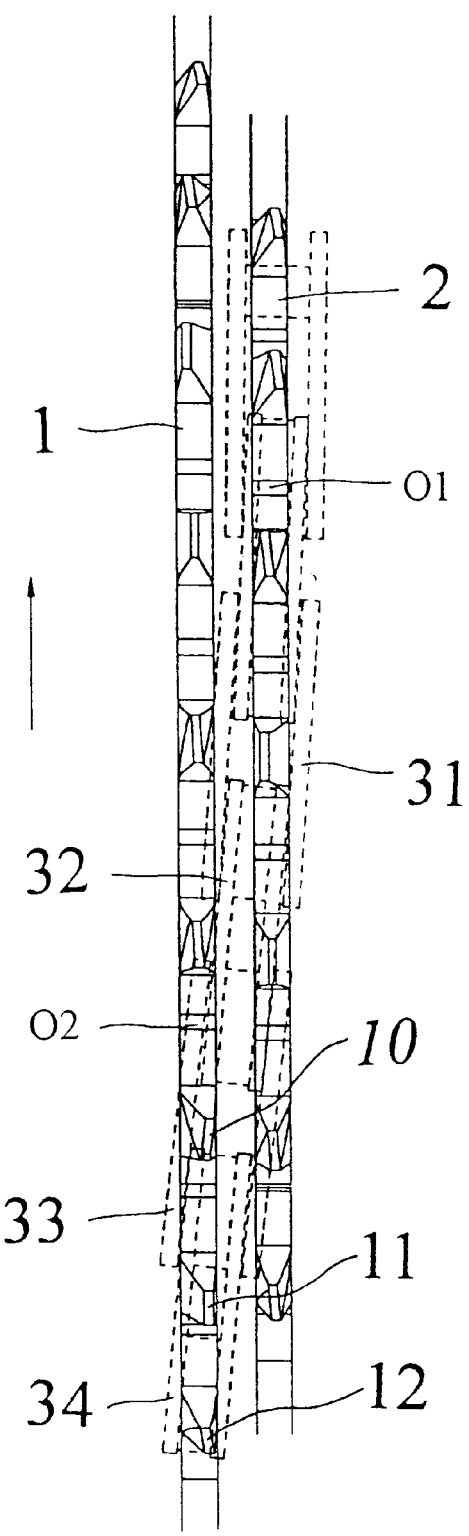
FIG. 4 is a plane view illustrating the first type of downshifting motion of the chain.
Figure 5:
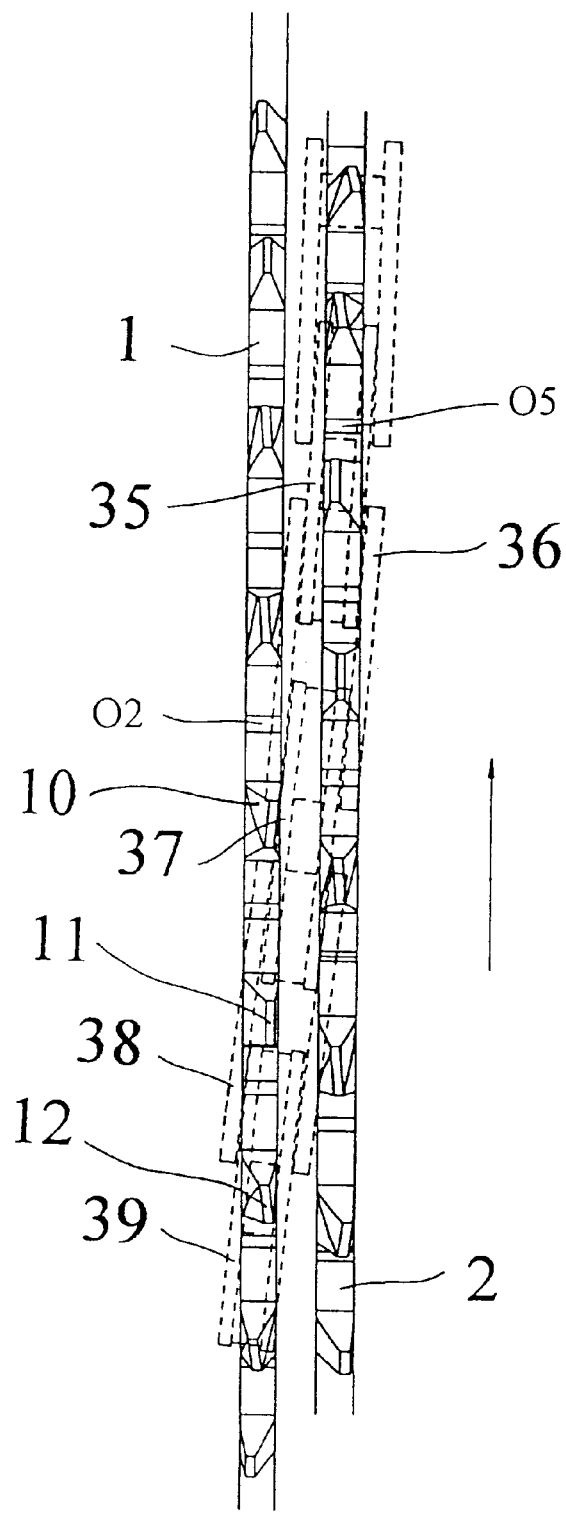
FIG. 5 is a plane view illustrating the second type of downshifting motion of the chain.

The trim portion 41 shown in FIG. 3 is trimmed according to the interference portion between the larger sprocket 1 and the outer pitch 31 in the first downshifting path shown in FIG. 1 or FIG. 4. The trim portion 42 is trimmed according to the interference portion between the larger sprocket 1 and the outer pitch 36 in the second downshifting path shown in FIG. 2 or FIG. 5. In addition, the trim portion 43 on the downshifting tooth 10, which is the tooth just behind the downshifting engagement point O2 in the rotation direction of the sprocket assembly, is obtained according to the interference portion between the larger sprocket 1 and the inner pitch 37 shown in FIG. 2 or FIG. 5.

Figure 6:
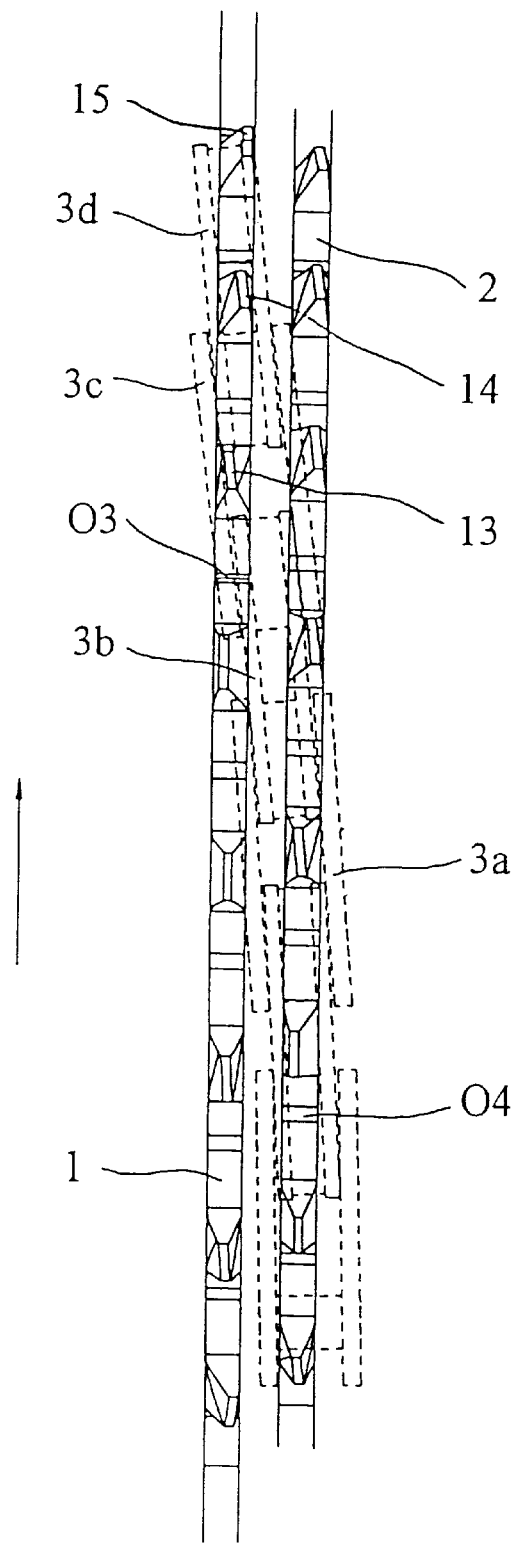
FIG. 6 is a plane view illustrating the first type of upshifting motion of the chain.
Figure 7:
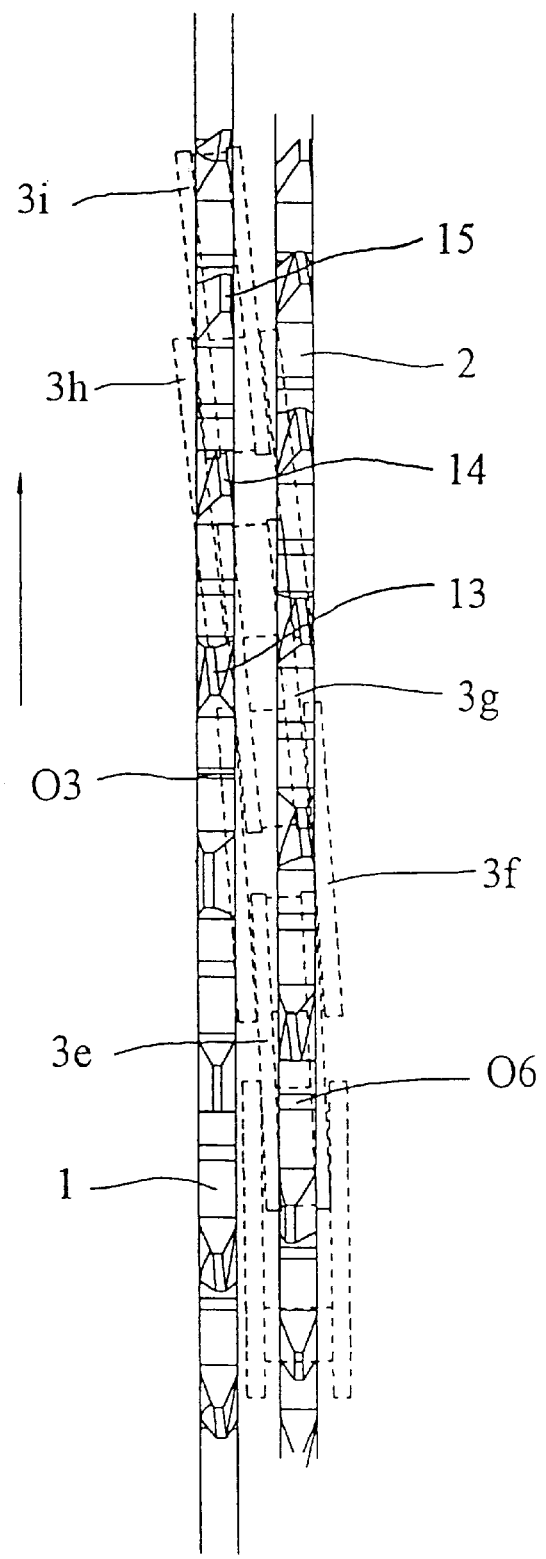
FIG. 7 is a plane view illustrating the second type of upshifting motion of the chain.

The tooth modification of the larger sprocket 1 for the upshifting motion of the chain 3 is similar to that for the above-mentioned downshifting motion. The trim portion 4a shown in FIG. 3 is obtained according to the interference portion between the larger sprocket 1 and the outer pitch 3a in the first upshifting path shown in FIG. 1 or FIG. 6. The trim portion 4b is obtained according to the interference portion between the larger sprocket 1 and the outer pitch 3f in the second upshifting path shown in FIG. 2 or FIG. 7. In addition, the trim portion 4c on the upshifting tooth 13, which is the tooth positioned just forward the upshifting escape point O3 in the rotation direction of the sprocket assembly, is obtained according to the interference portion between the larger sprocket 1 and the inner pitch 3g shown in FIG. 2 or FIG. 7. The primary function of the trim portion 4c is that when the chain 3 executes the upshifting motion by following the second upshifting path, the inner pitch 3g can easily escape from the larger sprocket 1.

Figure 8:
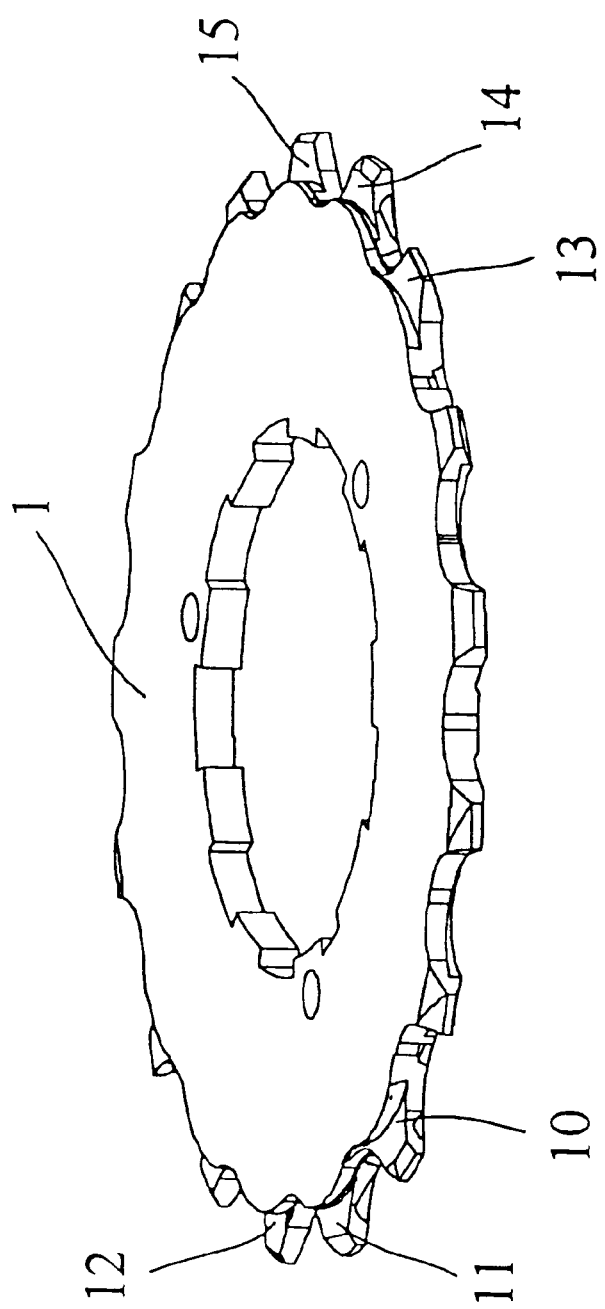
FIG. 8 is a perspective view of the larger sprocket showing the trim portion on its backside surface.

In addition to the aforementioned modification on the side surface of the larger sprocket 1 facing the smaller sprocket 2, the three consecutive teeth 10, 11, 12 behind the downshifting engagement point O2 in the rotation direction of the sprocket assembly are also trimmed on the side surface opposite to that facing the smaller sprocket 2, as shown in FIG. 8. The trim portion on the teeth 10, 11, 12 are made according to the interference portion between the larger sprocket 1 and the outer pitch 33 and inner pitch 34 shown in FIG. 1 or FIG. 4, and the outer pitch 38 and inner pitch 39 shown in FIG. 2 or FIG. 5. The trimming to the teeth 10, 11, 12 on the side surface away from the smaller sprocket 2 will allow the chain 3 to complete the downshifting motion smoothly.

Besides the trim portion on the teeth 10, 11, 12 of the larger sprocket 1, the three consecutive teeth 13, 14 15 forward the upshifting escape point O3 in the rotation direction of the sprocket assembly are also trimmed on the side surface opposite to that facing the smaller sprocket 2. The trim portions are made according to the interference portion between the larger sprocket 1 and the outer pitch 3c and inner pitch 3d shown in FIG. 1 or FIG. 6, and the outer pitch 3h and inner pitch 3i shown in FIG. 2 or FIG. 7. The trimming to the teeth 13, 14, 15 provides the function of increasing the chain's bias capability allowing it to escape away from the larger sprocket 1 easily, and to shift to the smaller sprocket 2, to complete the upshifting motion smoothly.

Figure 9:
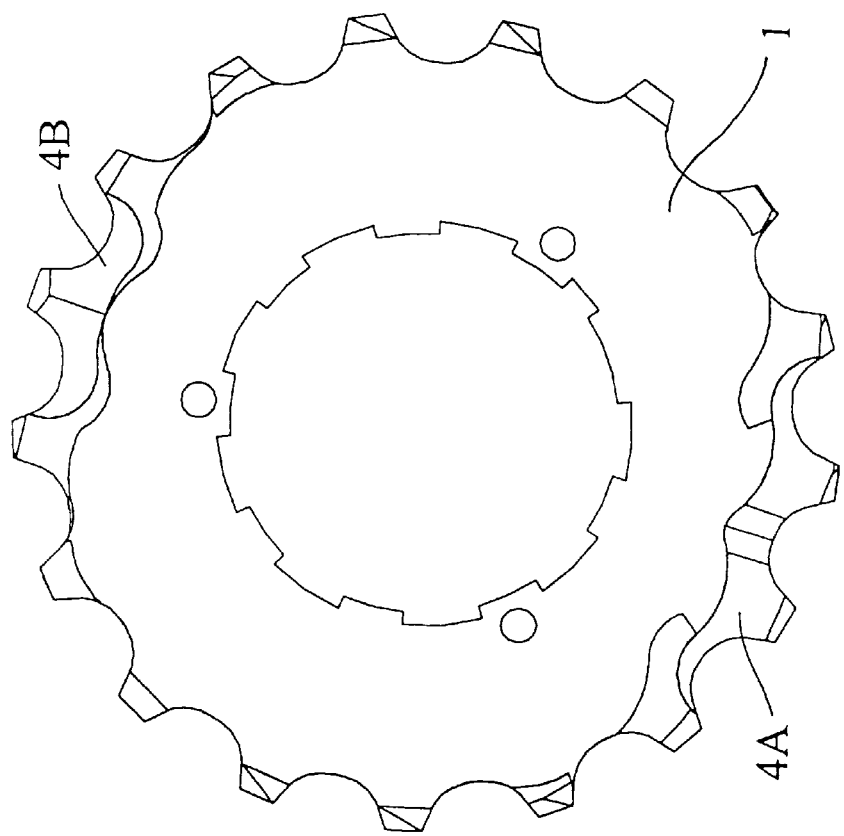
FIG. 9 is a front view showing two types of integrated trim portion on the front surface of larger sprocket.

The exact tooth number between the downshifting engagement point O2 and the upshifting escape point O3 is set for the basis of designing downshifting and upshifting paths of the chain 3, and is thus dependent on the tooth numbers of the larger sprocket 1 and smaller sprocket 2. As the tooth number between the downshifting engagement point O2 and the upshifting escape point O3 can be set as an odd or even numbers, the integrated trim portion 4, which comprises trim portions 41, 42, 43 for the downshifting motion and trim portions 4a, 4b, 4c for the upshifting motion, on the side surface of the larger sprocket 1 facing the smaller sprocket 2 thus may have different patterns. Two preferred patterns of the integrated trim portion 4 are shown in FIG. 9. The integrated trim portion 4A is obtained for the case that the downshifting engagement point O2 and the upshifting escape point O3 are separated by four sprocket teeth whereas the integrated trim portion 4b is obtained for the case that the two points are separated by three sprocket teeth.

Summarizing the above-described design method for the multistage sprocket assembly, this invention enables the smooth downshifting and upshifting performances of the chain 3 by appropriately arranging the relative position between the larger sprocket 1 and the smaller sprocket 2, as well as trimming the teeth of the larger sprocket 1. In this invention, the relative position between the downshifting engagement point O2 and the upshifting escape point O3 is first designated according to the tooth numbers of the larger sprocket 1 and the smaller sprocket 2, and there are at least three teeth between the two points. After this, the phase angle between the larger sprocket 1 and smaller sprocket 2 is then adjusted so that the downshifting phase angle $\phi 1$ is equal to or somewhat different from the upshifting phase angle $\phi 2$. According to the adjusted relative phase angle between the larger sprocket 1 and smaller sprocket 2, two downshifting and two upshifting paths are separately designed for the chain 3 as a reference for trimming the teeth of the larger sprocket 1. The method of trimming is by taking the chain links located in the designed two downshifting and two upshifting paths as the imaginary cutter to cut out the interference portion between the chain 3 and the larger sprocket 1 during the chain shifting process. The actual trimmed amount is determined by the amount of interference between the chain 3 and the larger sprocket 1 during the shifting process, as well as the minor modification done to meet manufacturing requirements. With the trimming on the larger sprocket 1, the chain 3 is free from the interference of the larger sprocket 1 during the chain shifting process. In addition, the integrated trim portion 4 will provide proper support to the side link plates of the transit chain so that the chain 3 can be shifted according to the designed shifting paths and thus smoothly completes the downshifting or upshifting motions.

We claim:

1. A multistage sprocket assembly for a bicycle comprising at least one larger sprocket and at least one smaller sprocket, each of said larger and smaller sprockets having a plurality of teeth on its outer periphery for engagement with a chain;

said larger sprocket having more teeth than said smaller sprocket;

said larger sprocket and said smaller sprocket having a common central axis of rotation;

said larger sprocket and said smaller sprocket being arranged side by side according to a predetermined interval and a relative phase angle;

said larger sprocket and said smaller sprocket both having a common direction of forward rotation about said central axis of rotation;

said larger sprocket having an inner side surface facing said smaller sprocket and an outer side surface opposite to said smaller sprocket;

said larger sprocket having a downshifting engagement point between a pair of adjacent teeth of said larger sprocket;

said larger sprocket also having an upshifting escape point between a pair of adjacent teeth of said larger sprocket;

said upshifting escape point being positioned forward of said downshifting engagement point in the rotation direction of said sprocket assembly, and said larger sprocket having at least three sprocket teeth between said downshifting engagement point and said upshifting escape point;

said larger sprocket having a downshifting tooth position behind said downshifting engagement point and having an upshifting tooth positioned forward of said upshifting escape point in the rotation direction of said sprocket assembly;

said larger sprocket having at least three consecutive teeth from said downshifting tooth in said rotation direction of said sprocket assembly being trimmed off on said inner side surface of said larger sprocket;

said larger sprocket having at least three consecutive teeth from said upshifting tooth in the direction opposite to said rotation direction of said sprocket assembly being trimmed off on said inner side surface of said larger sprocket.

2. A multistage sprocket assembly according to claim 1, wherein said larger sprocket has at least three consecutive teeth from said downshifting tooth in the rotation direction opposite to said rotation direction of said sprocket assembly being trimmed off on said outer side surface of said larger sprocket.

3. A multistage sprocket assembly according to claim 1, wherein said larger sprocket has at least three consecutive teeth from said upshifting tooth in the rotation direction of said sprocket assembly being trimmed off on said outer side surface of said larger sprocket.

4. A multistage sprocket assembly according to claim 1, wherein said trim portions on said inner side surface of said larger sprocket are trimmed in such a manner that said trim portions have chain transfer means for accommodating and supporting a portion of the chain during transfer of the chain between said larger sprocket and said smaller sprocket and for guiding the chain, during transfer, between said larger sprocket and said smaller sprocket.

* * * * *